United States Patent [19]
Hoagland et al.

[11] Patent Number: 5,893,580
[45] Date of Patent: Apr. 13, 1999

[54] MOTOR VEHICLE STEERING COLUMN SAFETY DEVICE

[76] Inventors: Larry D. Hoagland, 6314 Peacemaker Ln., Noblesville, Ind. 46060; William V. Hoagland, 1482 N. Co. Rd. 175 W., Greencastle, Ind. 46135

[21] Appl. No.: 08/654,905

[22] Filed: May 22, 1996

[51] Int. Cl.[6] ................................................ B60R 21/22
[52] U.S. Cl. ........................................ 280/731; 280/777
[58] Field of Search ............................ 280/777, 731, 280/728.1, 736, 737, 741, 742, 728.3; 74/493

[56] References Cited

U.S. PATENT DOCUMENTS

| | | | |
|---|---|---|---|
| 2,852,956 | 9/1958 | May | 280/777 |
| 2,899,214 | 8/1959 | D'Antini | |
| 3,481,626 | 12/1969 | Fergle | |
| 3,632,133 | 1/1972 | Hess | |
| 3,632,135 | 1/1972 | Chute | |
| 3,731,948 | 5/1973 | Risko | 280/150 |
| 3,777,772 | 12/1973 | Arnold et al. | 280/737 |
| 3,801,123 | 4/1974 | Jira | |
| 3,851,542 | 12/1974 | Adams et al. | 74/492 |
| 3,891,233 | 6/1975 | Damon | 280/150 |
| 4,021,058 | 5/1977 | Suzuki et al. | 280/737 |
| 4,991,871 | 2/1991 | Sadakata | 280/777 |
| 5,052,715 | 10/1991 | Ervin et al. | 280/777 |
| 5,145,208 | 9/1992 | Hoagland et al. | |
| 5,152,550 | 10/1992 | Hoagland et al. | |
| 5,193,848 | 3/1993 | Faulstroh | |
| 5,261,695 | 11/1993 | Brockman et al. | |
| 5,295,712 | 3/1994 | Omura | |
| 5,314,204 | 5/1994 | DuRocher | 280/777 |
| 5,342,089 | 8/1994 | Fink et al. | |
| 5,476,284 | 12/1995 | DuRocher et al. | 280/777 |
| 5,609,356 | 3/1997 | Mossi | 280/728.1 |

FOREIGN PATENT DOCUMENTS

| | | | |
|---|---|---|---|
| 2120043 | 8/1977 | Germany | 280/741 |
| 3809442 | 10/1989 | Germany | 74/493 |
| 1-41465 | 2/1989 | Japan | 74/493 |

OTHER PUBLICATIONS

National Highway Traffic Safety Administration (NHTSA), (DOT), Notice of Proposed Rule Making, Federal Register: Aug. 6, 1996 (vol. 61, No. 152); From the Fed. Reg. Online via GPO [wais.access.gpo.gov].

(List continued on next page.)

*Primary Examiner*—Eric D. Culbreth
*Attorney, Agent, or Firm*—Plews, Shadley, Racher and Braun

[57] ABSTRACT

A collapsible steering column for a motor vehicle has an elongated hollow cylinder slidably mounted on a piston while also fast to the piston for rotary movement. The space between the interior wall of the cylinder and the piston is sealed in a gas-tight fashion. A head is attached to the top of the cylinder. The head has a frangible seal hermetically secured inside it so that the top of the piston, the interior wall of the cylinder and the seal define an air cavity. The cavity is under pressure such that the cylinder is supported by a column of pressurized gas. A coil spring inside the cylinder urges the piston and the bottom of the cylinder apart. The seal has a bore in which resides an explosive compound. Lead lines connect the explosive compound with an electronic collision sensor, which is located in the front of the vehicle. When a collision occurs, the sensor sends an electronic signal which ignites the explosive compound and fractures the seal permitting the gas to escape from the cavity causing collapse of the cylinder. The vehicle's steering wheel is secured to the top of the head, and the piston is connected by way of appropriate linkages to the front wheels of the vehicle so that axial rotation of the cylinder, by way of the steering wheel, causes the front wheels to turn in accordance with normal vehicle operations. An air bag stowed in the steering wheel may be connected to the top of the head to capture the air released from the cavity providing additional protection to the occupant.

23 Claims, 6 Drawing Sheets

OTHER PUBLICATIONS

*Auto Smart*, Summer 1995, Delco Electronics.

*News Release, U.S. Department of Transportation, NHTSA 24–96*, Tuesday, May 21, 1996.

*TRW Starts Work ON $36 Million Airbag Plant*, IBB, Mar., 1996.

PR News wire Press Releases, *Morton Int. To Develop Integrated Steering Wheel For North American Auto Supplier*, Chicago, Feb. 6.

Advertising Brochure, Takata, Inc.

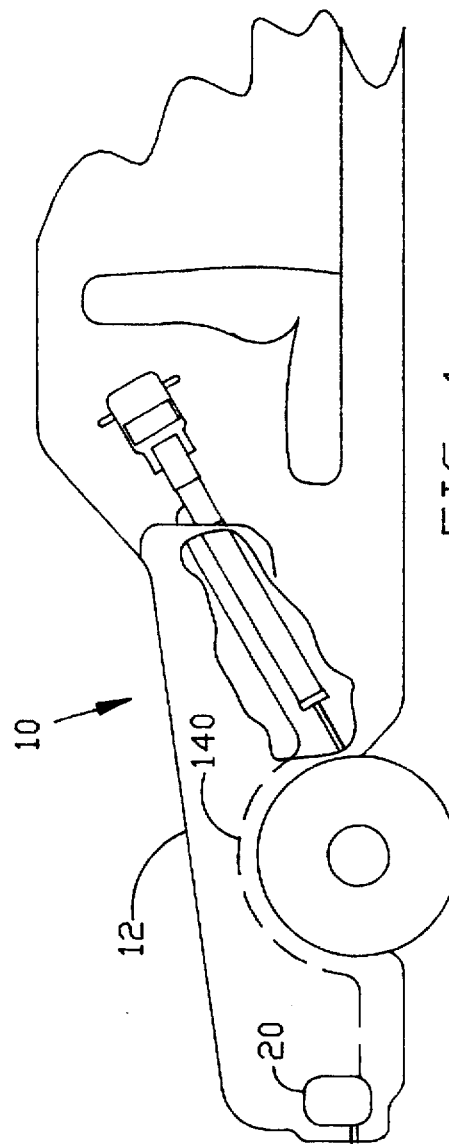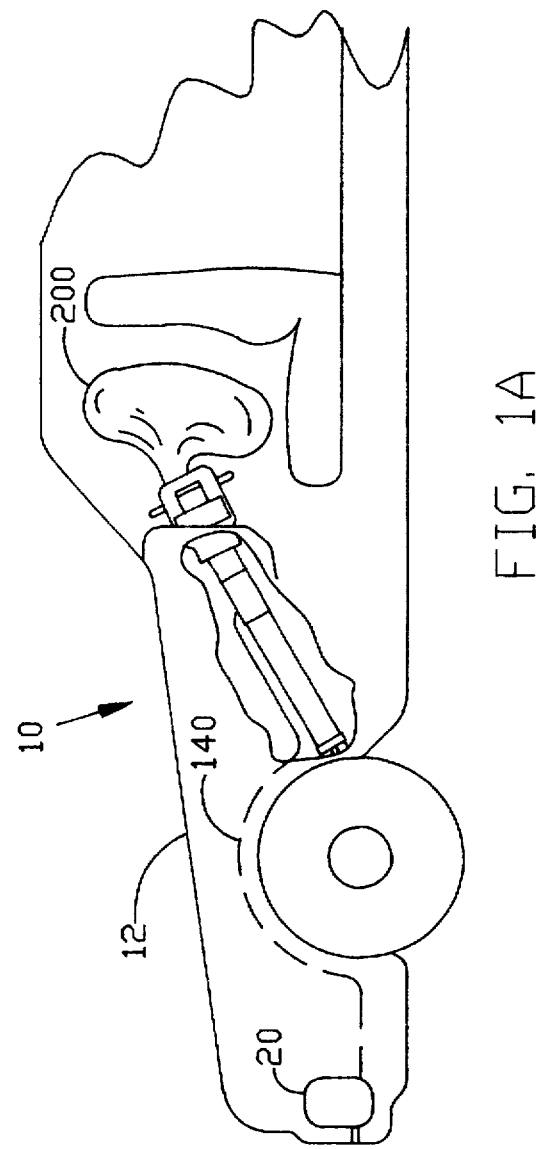

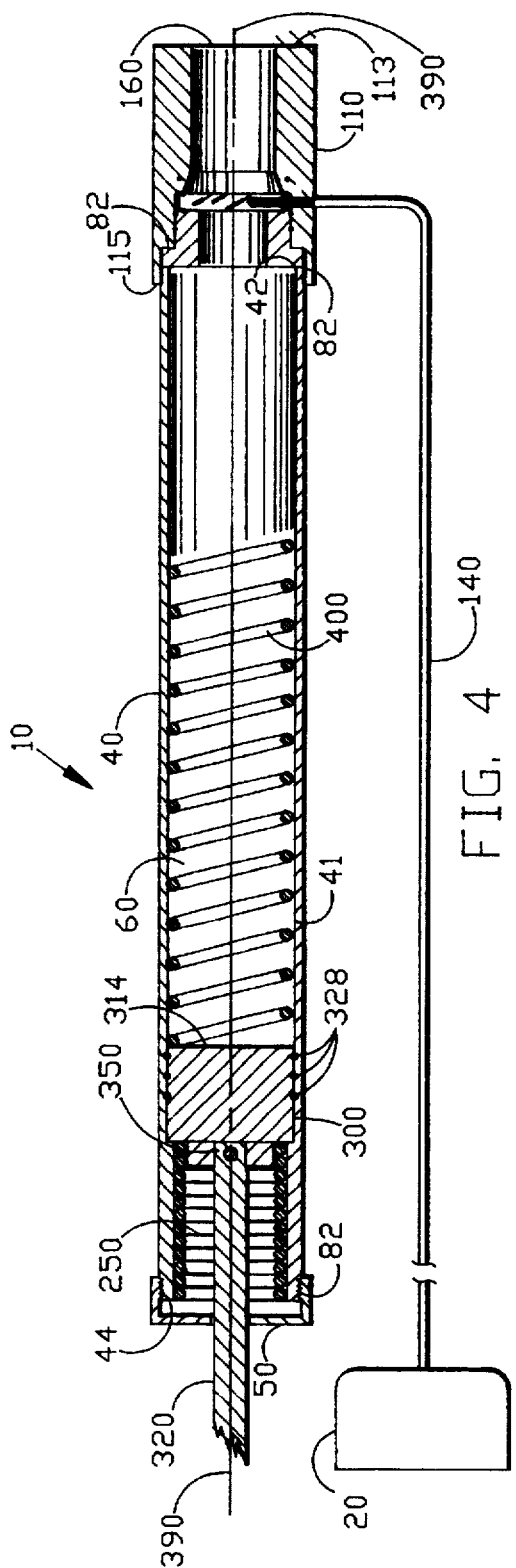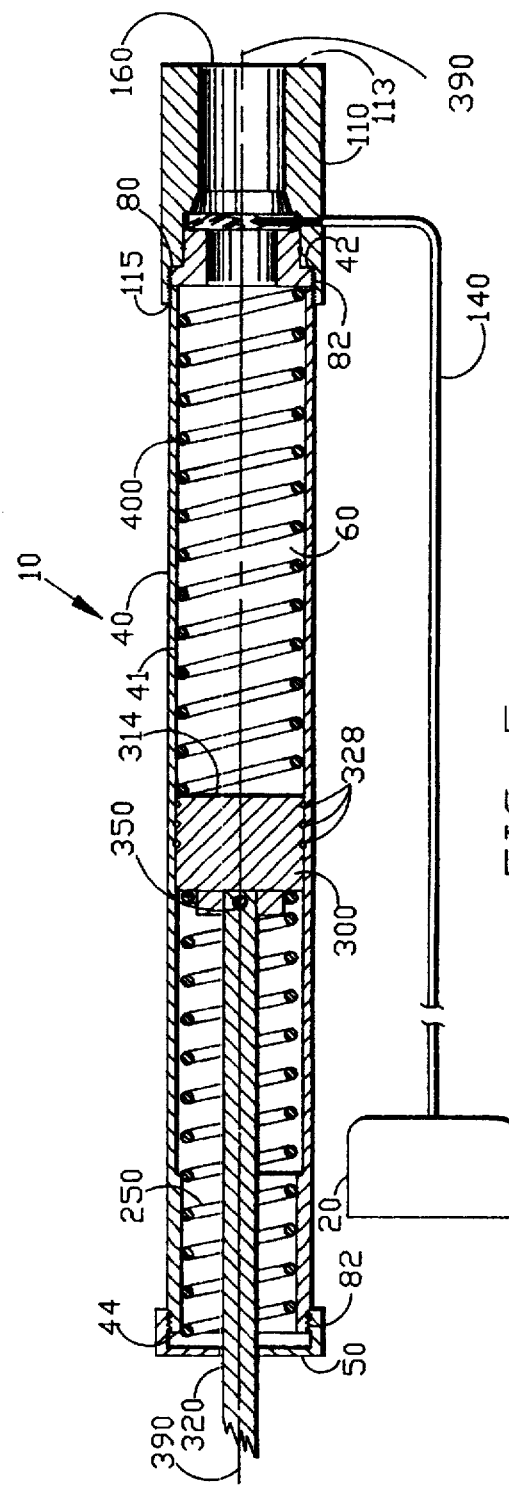

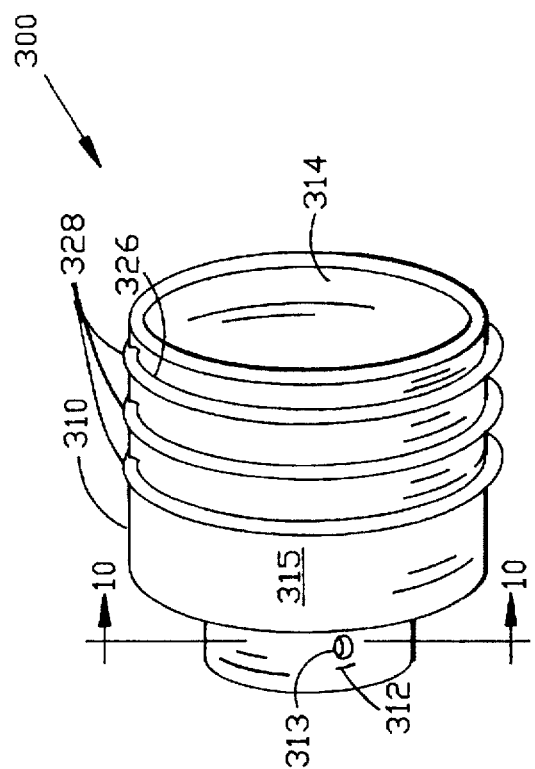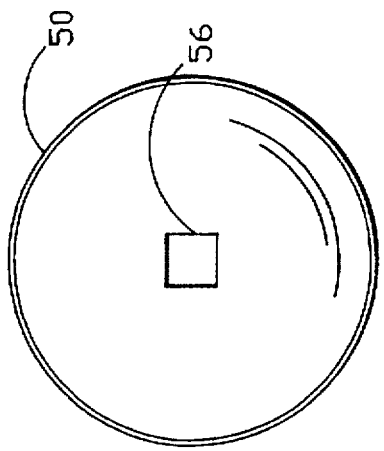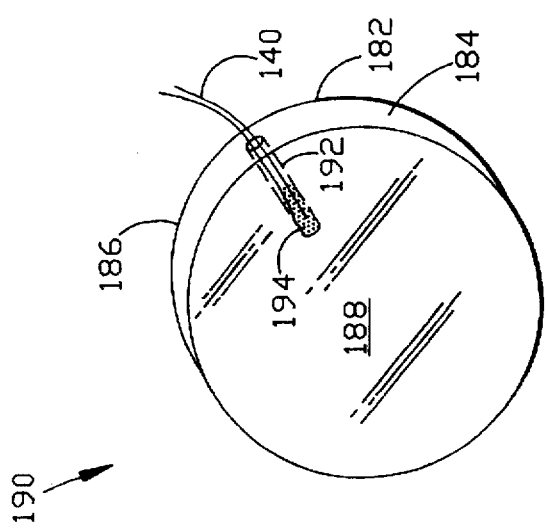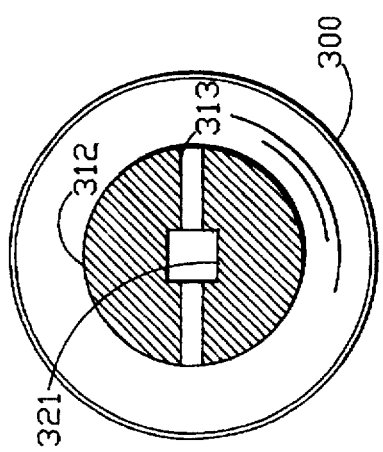

MOTOR VEHICLE STEERING COLUMN SAFETY DEVICE

BACKGROUND

The present invention pertains to automobile safety apparatus and more particularly pertains to a motor vehicle steering column safety device.

Modern vehicles, especially passenger cars, include a variety of passive safety mechanisms; e.g., head restraints, energy absorbing steering columns, and safety glass. However, no other single passive safety feature has had as dramatic effect on reducing the human cost of automobile fatalities and serious injuries as has the air bag. Thus, air bags are being introduced into automobiles at a very rapid rate. Effective Jan. 1, 1998, all U.S. fleet passenger cars must be equipped with air bags. Although analysis shows that air bag systems are working generally as intended, these systems still have some drawbacks.

First, in order to inflate the air bag in a fraction of a second, the inflating gas must be rapidly expanded into the air bag upon collision. To achieve this, some systems use mini chemical explosions which generate extreme heat. Some of these devices follow-up by introducing extremely cold gasses into the reaction so the occupant is not burned by the heat. These explosive gas apparatus require complicated gas storage, separation and flow control means which can sometimes fail. The complex design and manufacture of these systems add significantly to the cost of motor vehicles. As a result, cheaper model cars do not have air bags.

Another problem with the exploding gas systems is the noise. Testing data is replete with instances of vehicle glass being shattered by the blast. Besides frightening the occupants of the vehicle, deployment of the air bag, even in cases where deployment is accidental, can cause personal and/or property damage. The most common alternative to these "hybrid" chemical systems is the sodium azide inflator. Many air bags still use sodium azide inflators, but sodium azide is more toxic and expensive to produce than the hybrid design alternatives.

Third, canisters of these special chemicals along with the air bag often reside within the steering wheel. Thus, one can obtain a completely functional air bag safety device by stealing another's steering wheel. Steering wheel theft is a growing and unacceptable trend which promises only to get worse after Jan. 1, 1998.

Fourth, air bags are, for the most part, engineered for the average-sized-belt-restrained occupant. Thus, pregnant, obese, small and large-sized, and out-of-position occupants are more likely to collide with the steering column and suffer personal injury during collision. Therefore, the provision of a collapsible steering column has been recognized as desirable to provide an added safety factor for all occupants. Some prior systems combine the collapsible steering column and air bag safety devices together, but the prior art depends upon two independent systems: (1) an air bag inflator system, and (2) an independent steering column collapsing means.

Two independent systems take longer to achieve the desired result than a single actuating means. None of the preceding devices collapses the steering column concurrently with inflating the air bag, and the timing of air bag inflation and steering column collapse may be the difference between life and death. Some collapsible steering column safety devices heretofore available use cables and pulleys. Cable and pulley systems can wear out, break, or not respond properly in connection with the inflation of the air bag. The cable may become dislodged from the pulley track, for example.

Other energy absorbing steering columns have also been developed, but upon collision these apparatus deform and (1) make it impossible for the driver to transmit steering torque and/or (2) jeopardize rapid and efficient air bag inflation.

Finally, it is important that a steering column safety device meet original equipment manufacturer's (OEM) specifications and government standards and be economically feasible to implement into all foreign and domestic fleet automobiles.

Therefore, it is highly desirable to provide a new motor vehicle steering column safety device.

It is also highly desirable to provide a new motor vehicle steering column safety device which inflates an air bag faster than prior inflator systems.

It is also highly desirable to provide a new motor vehicle steering column safety device which inflates an air bag without the use of toxic chemicals or chemicals which generate extreme heat and/or cold.

It is also highly desirable to provide a new motor vehicle steering column safety device which does not require complicated gas storage, separation and flow control means.

It is also highly desirable to provide a new motor vehicle steering column safety device which does not utilize a loud mini-explosion in order to rapidly expand the inflator gas into the air bag.

It is also highly desirable to provide a new motor vehicle steering column safety device which collapses the steering column concurrently with inflating an air bag.

It is also highly desirable to provide a new motor vehicle steering column safety device with the inflator gas and gas flow control means contained within the steering column.

It is also highly desirable to provide a new motor vehicle steering column safety device which does not use pulleys, cables and other movable parts which can break or become worn.

It is also highly desirable to provide a new motor vehicle steering column safety device capable of delivering steering torque while collapsing the steering column concurrently with inflating an air bag upon collision.

It is also highly desirable to provide a new motor vehicle steering column safety device capable of damping the force delivered to the steering column by an occupant upon impact.

It is also highly desirable to provide a new motor vehicle steering column safety device which meets all of the original equipment manufacturer's (OEM) specifications and required regulations, can be cheaply manufactured and easily installed into any make and model of vehicle.

It is finally highly desirable to provide a new motor vehicle steering column safety device which meets all of the above desired features.

SUMMARY

It is an object of the invention to provide a new motor vehicle steering column safety device.

It is also an object of the invention to provide a new motor vehicle steering column safety device which inflates an air bag faster than prior inflator systems.

It is an object of the invention to provide a new motor vehicle steering column safety device which inflates an air bag without the use of toxic chemicals or chemicals which generate extreme heat and/or cold.

It is an object of the invention to provide a new motor vehicle steering column safety device which does not require complicated gas storage, separation and flow control means.

3

It is also an object of the invention to provide a new motor vehicle steering column safety device which does not utilize a loud mini-explosion in order to rapidly expand the inflator gas into the air bag.

It is an object of the invention to provide a new motor vehicle steering column safety device which collapses the steering column concurrently with inflating an air bag.

It is an object of the invention to provide a new motor vehicle steering column safety device with the inflator gas and gas flow control means contained within the steering column.

It is an object of the invention to provide a new motor vehicle steering column safety device which does not use pulleys, cables and other movable parts which can break or become worn.

It is an object of the invention to provide a new motor vehicle steering column safety device capable of delivering steering torque while collapsing the steering column concurrently with inflating an air bag upon collision.

It is also an object of the invention to provide a new motor vehicle steering column safety device capable of damping the force delivered to the steering column by an occupant upon impact.

It is also an object of the invention to provide a new motor vehicle steering column safety device which meets all of the original equipment manufacturer's (OEM) specifications and required regulations, can be cheaply manufactured and easily installed into any make and model of vehicle.

It is finally an object of the invention to provide a new motor vehicle steering column safety device which meets all of the above desired features.

In the broader aspects of the invention there is provided a motor vehicle steering column safety device for use in a motor vehicle that has a steering wheel for communicating steering torque to a steering mechanism, and that has a sensing means for sensing a collision. The steering column safety device has a hollow cylinder with a top and a bottom. The top is adapted for receiving a steering wheel. There is a piston residing within the cylinder, which is adapted for connecting to the steering mechanism of the vehicle.

The cylinder is movable relative to the piston between an extended position and a collapsed position.

There is an air cavity in the cylinder prior to collision that contains pressurized gas. The cylinder also has an outlet. There is a coil spring positioned in the cylinder for biasing the cylinder and the piston apart. A gas flow control means for controlling the flow of gas out of the air cavity is connected to the outlet and in communication with the sensing means. The air cavity and the gas flow control means are generally axially aligned.

During operation, the gas flow control means prevents the flow of the pressurized gas from the air cavity prior to collision, and a signal produced by the sensing means actuates the gas flow control means upon collision, which allows the pressurized gas to flow out of the cavity permitting movement of the cylinder from the extended position to the collapsed position.

There is also provided for use in a vehicle having collision sensing means connected thereto for producing a signal in response to a collision, a gas flow control means for controlling the flow of pressurized gas contained in a canister into an air bag connected to a vehicle steering device and deployed upon collision to protect an occupant. The gas flow control means has a head with opposite ends, an axial bore having an interior wall extending through the head, and a frangible seal in the bore. One end of the head is secured to the cylinder, and the other end is secured to the air bag. The seal interrupts the free flow of the pressurized gas from the canister into the air bag via the axial bore.

The frangible seal has a pair of opposite sides and a circumferential wall connecting the sides. There is a bore with an explosive charge residing therein formed in the wall. A head bore is formed in the head and connects the bore and the exterior of the head. Wires electrically connect the explosive charge to the sensing means. In operation, the signal upon collision causes the charge to explode such that a breach is formed in the seal, thus allowing the free flow of the pressurized gas from the cylinder into the air bag via the axial bore.

DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 1 is a fragmentary side elevational view of the steering column safety device shown installed in a motor vehicle and in the extended position.

FIG. 1A is the same view as FIG. 1 except that the steering column safety device of the invention is in its collapsed position.

FIG. 4 is a side cross-section on the line 4—4 of FIG. 2 in the direction of the arrows showing a side plan view of an embodiment of the steering column safety device of the invention in the extended position.

FIG. 5 is a side cross-sectional view like the view shown in FIG. 4 except the steering column safety device of the invention is in the collapsed position.

FIG. 8 is an elevated side perspective view showing an embodiment of the seal of the steering column safety device of the invention.

FIG. 9 is an elevated side perspective view showing an embodiment of the piston of the steering column safety device of the invention.

FIG. 10 is a bottom cross-section on the line 10—10 of FIG. 9 in the direction of the arrows showing the boss and piston of the steering column safety device of the invention.

FIG. 11 is a bottom plan view of an embodiment of the cap of the invention.

DESCRIPTION

Figure 2:
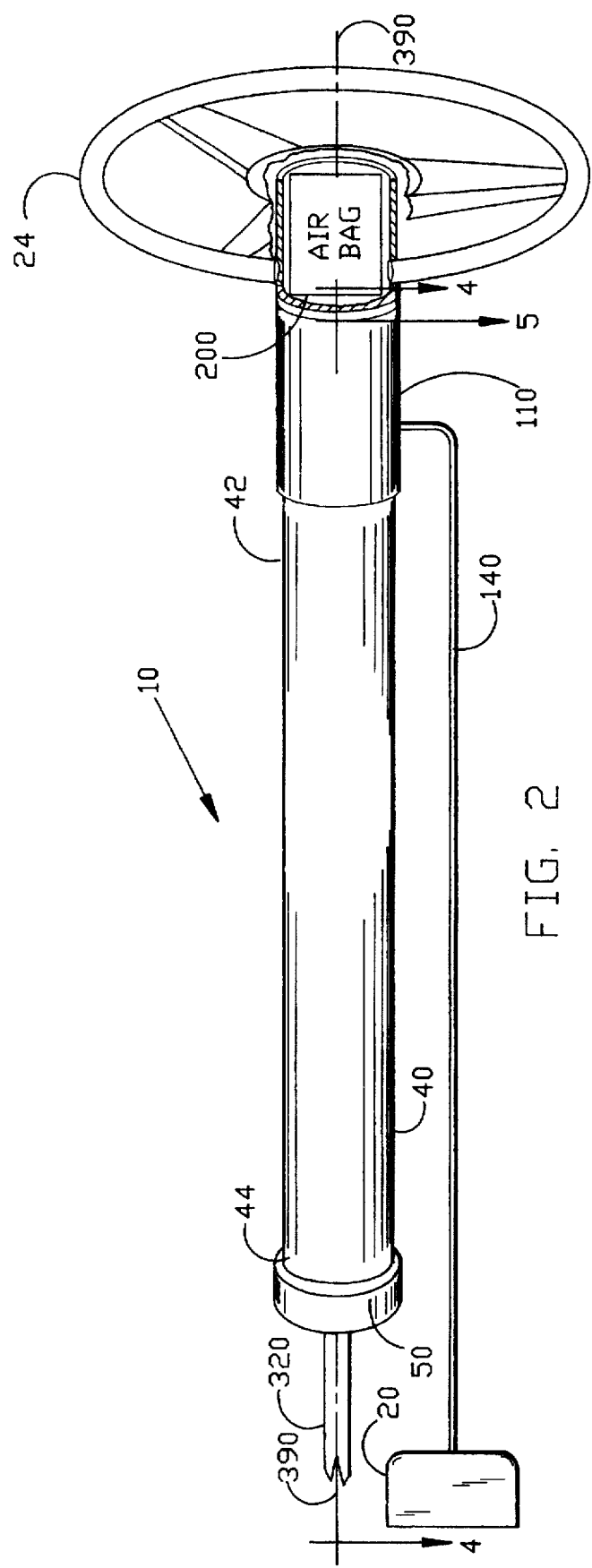
FIG. 2 is a side partial cut-away elevational perspective view of the steering column safety device of the invention.

FIGS. 1 and 1A show steering column safety device 10 mounted in motor vehicle 12. Sensing means 20 is connected to steering column safety device 10, for example, by wire 140. Referring to FIGS. 2–5, steering column safety device 10 includes hollow cylinder 40, head 110, cap 50, and axial rod 320. Cylinder 40, head 110, cap 50, and axial rod 320 are generally axially aligned along axis 390 and formed from machinable metal, such as brass, stainless steel or steel alloy as desired. Cylinder 40, head 110 and cap 50 may be insulated by known means or formed from an insulating material which is rigid and capable of containing elevated gas pressures of about 600 to 1,000 p.s.i. Head 110 is secured to top 42 of cylinder 40, and cap 50 is secured to bottom 44 of cylinder 40 by known means, such as threads 82. In an embodiment, cylinder 40 and head 110 are secured together in a gas-tight fashion. In that embodiment, pressurized gas from atmospheric pressure to elevated pressures is contained in hollow cylinder 40.

The top of head 110 is adapted for receiving standard steering wheel 24. Cap 50 has bore 56 extending therethrough, as shown in FIG. 11. The shape of bore 56 is the same as the cross-section of axial rod 320, and tolerances of bore 56 and axial rod 320 are such as to accommodate axial movement of cap 50 with cylinder 40 and head 110 as a single unit along axial rod 320. One embodiment includes square axial rod 320. In that embodiment, bore 56 is formed in the shape of a square such that steering torque can be delivered to the steering mechanism of vehicle 12 via steering wheel 24, cylinder 40, cap 50 and axial rod 320, which all rotate as a single unit about axis 390.

Inside hollow cylinder is air cavity 60, piston 300, and biasing means, such as coil spring 250. One embodiment has damping means, such as coil spring 400 also positioned in cylinder 40, as shown in FIG. 5.

Referring to FIGS. 9 and 10, piston 300 includes generally cylindrical solid body 310 having boss 312 at one end and air cavity surface 314 at the other end. In the preferred embodiment, boss 312 is integrally formed with solid cylindrical body 310. Circumferential wall 315 joins boss 312 with air cavity surface 314. Boss 312 has rod seating bore 321 extending generally axially therein with pin hole 313 extending transversely through boss 312. Circumferential wall 315 engages the interior wall of cylinder 40 in a gas-tight fashion. An embodiment has at least one o-ring groove 326 formed therein where at least one o-ring 328 resides so that piston 300, the interior wall of cylinder 40 and gas flow control means 100 define gas-tight cavity 60 for containing pressurized gas prior to collision. Piston 300 is formed of machinable metal, such as brass or steel alloy, and, in the embodiment shown, axial rod 320 connects boss 312 via roll pin 350 to the steering mechanism of vehicle 12. Piston 300 may be formed of other material or composites thereof, so long as interior wall of cylinder 40 is slidable on piston 300 on contiguous portions, such as O-rings 328, for example.

Figure 3:
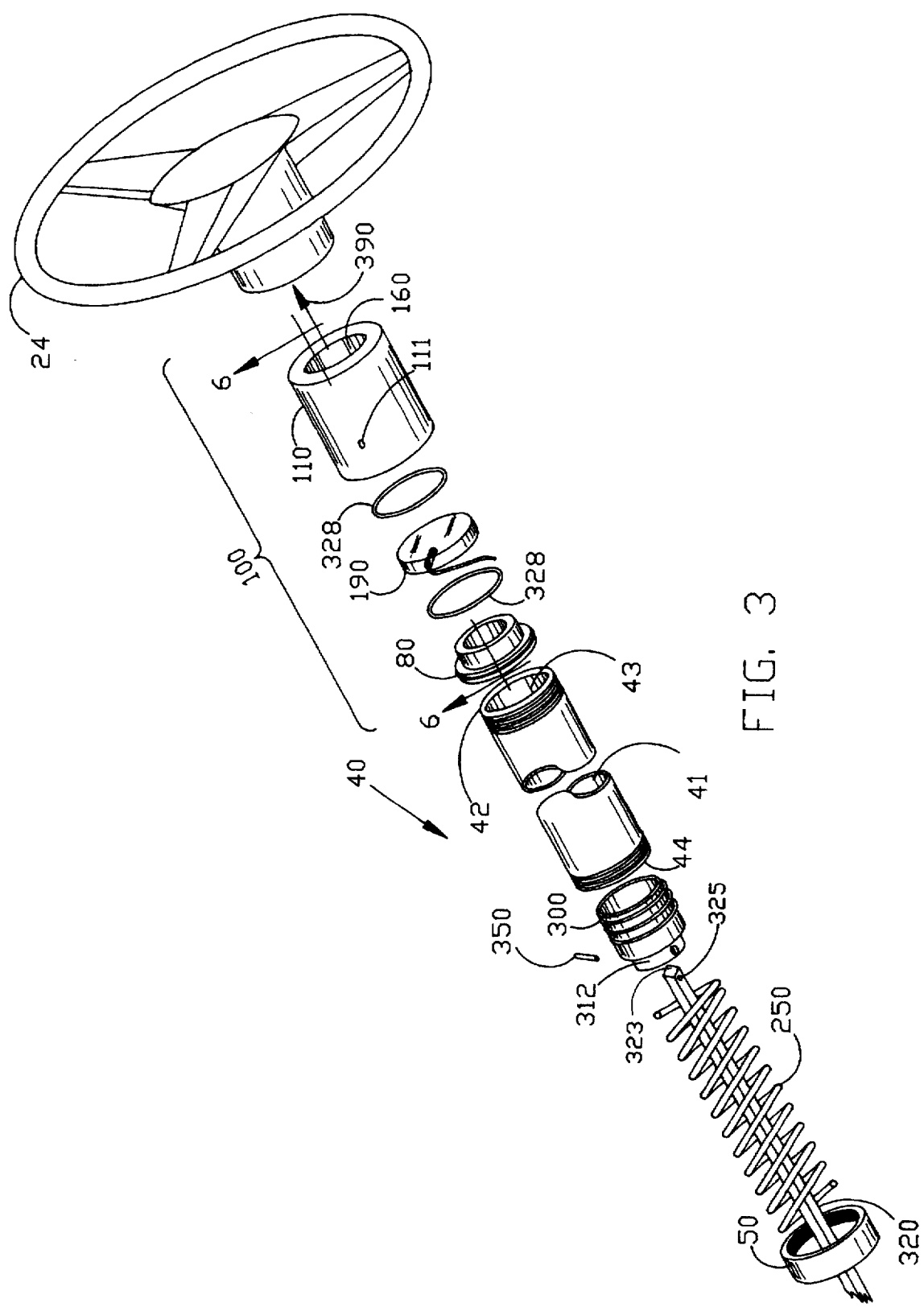
FIG. 3 is a side elevational perspective view of an embodiment of the steering column safety device of the invention shown disassembled.
Figure 7:
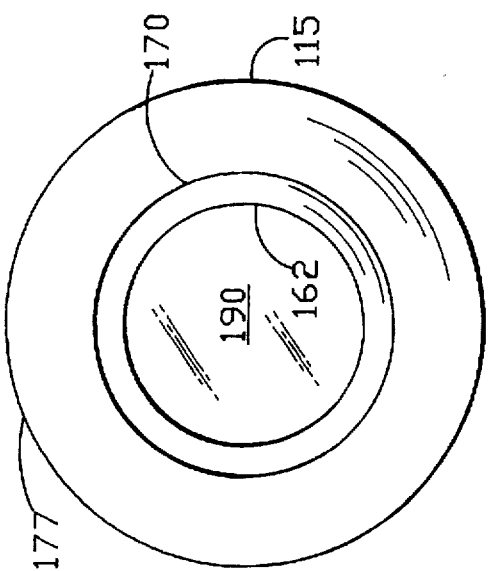
FIG. 7 is a bottom plan view of an embodiment of the head of the steering column safety device of the invention.

Referring now to FIGS. 3 and 6–8, top 42 of hollow cylinder 40 has outlet 43, and in an embodiment, gas flow control means 100, shown disassembled in FIG. 3, is coupled thereto. Gas flow control means 100 in its assembled condition is referred to in this description as head 110. In that embodiment, cylinder 40 contains pressurized gas. It is entertained that gas flow control means 100 is well-suited for use in connection with any pressurized fluid or gas container. Gas flow control means is for use in any vehicle having a collision sensing means connected thereto for producing a signal in response to a collision, where it is desirable to control the flow of pressurized fluid or gas from a container into an air bag connected inside a vehicle and deployed upon collision to protect an occupant. Gas flow control means 100 includes head 110, O-rings 328, seal 190 and spacer member 80. Axial bore 160 extends through head 110 and includes bore wall 162 with entrance port 170 and seal housing 175 formed therein. Entrance port 170 is tapered with the larger end contiguous with seal 190. A generally transverse head bore 111 joins the exterior of head 110 and bore wall 162.

Figure 6:
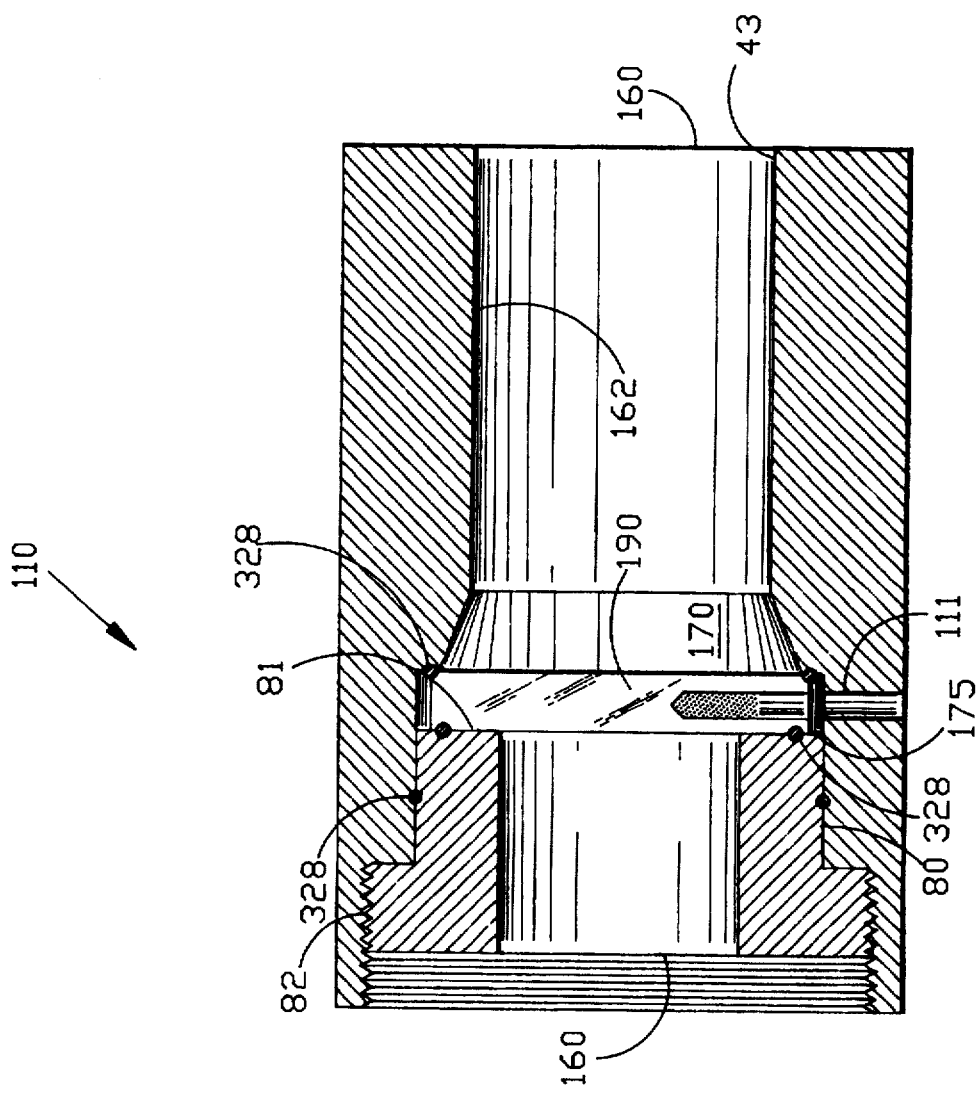
FIG. 6 is a side cross-section on the line 6—6 of FIG. 3 in the direction of the arrows showing a side plan view of the head of the steering column safety device of the invention.

Seal 190 is positioned within seal housing 175 and occludes axial bore 160, as shown in FIG. 6. O-rings 328 contact opposite sides 186,188 of seal 190, and spacer member 80 abuts o-ring 328 contiguous with opposite side 186. Additional O-rings 328 may be positioned between bore wall 162 and spacer member 80 as desired.

Referring now to FIGS. 6 and 8, seal 190 includes frangible disc-shaped body 182 having opposite sides 186, 188 and wall 184, which joins opposite sides 186,188. Disc-shaped body 182 may be formed from a number of glass composites and may have tempered or annealed portions as desired. One embodiment has opposite sides 186, 188 formed from a sodium lime glass composition and wall 184 formed from tempered glass. Seal bore 192 extends transversely into wall 184 of seal 190. In that embodiment, tempered glass is well-suited for drilling bore 192 and resists shattering during manufacture. Explosive charge 194 resides in bore 192 and is formed from a mixture of pentaerythiritol tetranitrate (PETN), lead azide, potassium perchlorate, and sulfur, for example. Explosive charge 194 requires an ignition temperature suitable for igniting by electrical means, such as a signal produced by sensing means 20. In an embodiment explosive charge 194 has an ignition temperature of about 300 degrees Fahrenheit.

Seal 190 is positioned in seal housing 175 and rotated so that transverse bore 192 containing explosive charge 194 is aligned with head bore 111. Wires 140 are, thus, able to extend from transverse bore 192 through head bore 111 to the exterior of steering column safety device 10 connecting explosive charge 194 to sensing means 20.

In operation, prior to collision, head 110, including its contents secured as above-described, threadedly engages top 42 of cylinder 40 and is sealed by known means, such as pipe dope or tape. Pressurized gas or fluid is pumped into cavity 60 using known valving apparatus, such as a Schrader valve for example, connecting the exterior and interior of cavity 60. It is entertained that cavity 40 can be pre-pressurized upon manufacture as well. A breathable anhydrous gas, such as nitrogen, works best because these gasses resist decomposition and have no water of crystallization. One advantage of the embodiment with valving (not shown) enables steering column device 10 to be easily refueled after deployment avoiding the inconvenience of shipping steering column safety device 10 to the manufacturer in the event vehicle 12 is still operational after a collision.

As the pressure inside cavity 60 is elevated, cylinder 40, head 110 and cap 50 all move forward axially as a single unit relative to piston 300 and axial rod 320, until reaching the extended position, as shown in FIGS. 1 and 4. Biasing means, such as coil spring 250, assumes a compressed condition. Damping means, such as coil spring 400, as shown in FIG. 5, is for the most part generally relaxed in the extended position, the collapsed position and therebetween. Steering column safety device 10 is capable of delivering steering torque and, thus, is fully operational assuming normal vehicle steering column functions.

The occupant may deliver steering torque by way of steering wheel 24. Steering torque is delivered to the steering mechanism of the vehicle via head 110, cylinder 40, piston 300, cap 50 and axial rod 320, which all rotate as a single unit about axis 390. O-rings 328 on piston 300 engage the interior wall of cylinder 40 and displace rotational force from cylinder 40 to piston 300 and axial rod 320. In other words, the side walls of bore 56 engage axial rod 320 transferring steering torque from steering wheel 24 to axial rod 320 via piston 300 during the extended position, the collapsed position and therebetween.

Upon collision, sensing means 20 produces a signal, which is communicated through wire 140 to head 110. Wire 140 resides within head bore 111 and contacts explosive charge 194. The signal ignites charge 194 causing charge 194 to explode such that a breach is formed in body 182, thereby allowing rapid free flow of pressurized gas from air cavity 60 into air bag 200 via entrance port 170 and axial bore 160. The amount and composition of explosive charge 194 determines the noise level and size the breach formed in body 182. In an embodiment, a small explosive charge 194 is provided such that body 182 is only cracked or fragmented so that the rush of pressurized gas from air cavity 60 completes the destruction of seal 190. In that embodiment, the sound made by explosive charge 194 is dramatically reduced when compared to current "hybrid" explosive systems.

Concurrently with the flow of gas out of cavity 60, biasing means, such as coil spring 250, rapidly assumes the relaxed position forcing cap 50 and boss 312 apart moving cylinder 40 axially rearwardly from the extended position to the collapsed position, as shown respectively in FIGS. 1, 1a, 4 and 5. Air cavity 60 and head 110 are generally axially aligned such that the pressurized gas flows generally axially out of cavity 60. The collapsing action of the cavity 60 forces pressurized gas out of cavity 60 axially at a rate exceeding a free flow. In addition, entrance port 170 guides the pressurized gas into the shape of a whirling vortex maximizing the rate at which pressurized gas flows from the cavity 60 and into air bag 200. The rate of flow of the gas into the air bag far exceeds the rate of inflatable air bag systems to date without the use of toxic chemicals or chemicals which generate extreme heat and/or cold.

Moreover, the same superior rates of collapse of the steering wheel column, like cylinder 40 for example, and inflation of air bag 200 can easily be achieved regardless of the make or model of the vehicle. The length and diameter of cylinder 40, axial bore 160, entrance port 170, the degree of the taper of entrance port 170, the tension of biasing means, such as coil spring 250, the length of movement between the extended position and the collapsed position, the amount and size of explosive charge 194, and so on, may all be adjusted to achieve the desired result specific to any make or model of vehicle.

Steering column safety device 10 of the invention discloses a generally axially aligned system which does not require complicated gas storage, separation and flow control means. In addition, gas flow control means 100 rapidly expands the inflator gas into the air bag without utilizing a loud mini-explosion. Ignition of explosive charge 194 makes a sound similar to that of a child's cap gun whereby the occupant is not frightened and shattering of the vehicle's windows is precluded.

Moreover, the steering column safety device 10 of the invention is capable of delivering steering torque while collapsing the steering column concurrently with inflating an air bag upon collision. In addition, there is no incentive to steal steering wheel 24, since it is a standard steering wheel 24 and not a fully operational safety device it contains no inflator device and is useless without gas flow control means 100 and cylinder 40.

Steering column safety device 10 removes the "killer" steering column concurrently with inflating an air bag 200 without using pulleys, cables and/or other movable parts which can break or become worn, and provides a faster more efficient steering column safety device 10 than heretofore available. And, damping means, such as coil spring 400, is capable of damping the force delivered to the collapsed steering column by an occupant upon collision (See FIG. 5). Thus, steering column safety device 10 is capable of providing added safety for all occupants, regardless of size, non-belt-restrained occupants and out-of-position occupants.

Finally, new motor vehicle steering column safety device 10 meets original equipment manufacturer's (OEM) specifications and all of the required regulations, and novel motor vehicle steering column safety device 10 can be cheaply manufactured and easily installed into any make and model of vehicle.

While a specific embodiment of the invention has been shown and described herein for purposes of illustration, the protection afforded by any patent which may issue upon this application is not strictly limited to the disclosed embodiment, but extends to all structures and arrangements which fall fairly within the scope of the claims which are appended hereto.

What is claimed is:

1. A steering column safety device and valve head combination for use in a motor vehicle having a steering wheel for communicating steering torque to a steering mechanism, and having collision sensing means for sensing a collision operably mounted on the vehicle, the device comprising:

a hollow cylinder having a top and a bottom, a head secured to the top for receiving a steering wheel, the head having an outlet;

a piston residing within the cylinder;

a rod connecting the piston to the steering mechanism of the vehicle, wherein the cylinder is axially slidable on the piston between an extended position and a collapsed position;

sealing means for sealing a space between the interior wall of the cylinder and the piston, thereby defining a gas-tight cavity between the piston and the head containing pressurized gas;

a frangible seal hermetically secured within the head between the steering wheel and the cavity;

biasing means inside the cylinder for biasing the piston and the bottom of the cylinder apart; and, fracturing means for fracturing the seal in communication with the sensing means, wherein the seal prevents the flow of the pressurized gas from the cavity prior to collision, and a signal produced by the sensing means actuates the fracturing means upon collision, thereby allowing the pressurized gas to flow out of the cavity via the head permitting movement of the cylinder from the extended position to the collapsed position.

2. The combination of claim 1 wherein the cavity, the seal and the head are generally axially aligned such that the pressurized gas flows generally axially out of the cavity.

3. The combination of claim 1 wherein a cap with a bore extending therethrough is secured to the bottom of the cylinder, the rod has a cross-section, and the configuration of the bore in the bottom of the cylinder is shaped for receiving the rod such that the cylinder, the rod, and the piston rotate as a single unit about an axis to transmit steering torque to the steering mechanism.

4. The combination of claim 1 wherein an air bag is positioned within the steering wheel for protecting an occupant.

5. The combination of claim 4 wherein a cap with a bore extending therethrough is secured to the bottom of the cylinder, the rod has a cross-section, and the configuration of the bore in the bottom of the cylinder is shaped for receiving the rod such that the cylinder, the rod, and the piston rotate as a single unit about an axis to transmit steering torque to the steering mechanism.

6. The combination of claim 4 wherein the cavity, the seal and the head are generally axially aligned such that the pressurized gas flows generally axially out of the cavity.

7. The combination of claim 1 wherein the seal further comprises a body having a pair of opposite sides and a circumferential wall connecting the sides, a transverse bore for containing an explosive charge formed in the wall.

8. The combination of claim 7 further comprising a generally transverse head bore formed in the head for connecting the seal and the exterior of the head, and wires positioned in the head bore electrically connecting the explosive charge to the sensing means.

9. A steering column safety device and valve head combination for use in a motor vehicle having a steering wheel for communicating steering torque to a steering mechanism, and having collision sensing means for sensing a collision operably mounted on the vehicle, the device comprising:

an elongated hollow cylinder having a top and a bottom, a cap with a bore extending therethrough is secured to the bottom;

a piston residing within the cylinder;

a rod connecting the piston to the steering mechanism of the vehicle, wherein the cylinder is axially slidable on the piston between an extended position and a collapsed position;

biasing means inside the cylinder for biasing the piston and the bottom of the cylinder apart;

pressurized gas being contained in the cylinder;

an inflatable air bag positioned within the steering wheel for protecting an occupant; and, gas flow control means coupled to the cylinder between the pressurized gas and the air-bag, the gas flow control means being in communication with the sensing means for releasing the pressurized gas from the cylinder upon collision.

10. The combination of claim 9 wherein the cylinder and the gas flow control means are generally axially aligned such that the pressurized gas flows generally axially out of the cylinder.

11. The combination of claim 9 gas flow control means comprises a head, an axial bore extending through the head, and a seal in the bore, wherein the head is secured to the top of the cylinder in a gas-tight fashion the seal further comprising a frangible body having a pair of opposite sides and a circumferential wall connecting the sides, a seal bore with an explosive charge residing therein formed in the wall.

12. The combination of the claim 11 further comprising a generally transverse head bore formed in the head connecting the seal and the exterior of the head, and wires positioned in the head bore electrically connecting the explosive charge to the sensing means.

13. The combination of claim 12 wherein the rod has a cross-section, and the configuration of the bore in the cap is shaped for receiving the rod such that the cylinder, the rod, and the piston rotate as a single unit about an axis to transmit steering torque to the steering mechanism.

14. A steering column safety device and valve head combination for use in a motor vehicle having a steering wheel for communicating steering torque to a steering mechanism, and having collision sensing means for sensing a collision operably mounted on the vehicle the device comprising:

a hollow cylinder having a top and a bottom, an interior wall joining the top and the bottom;

a cap with a bore extending therethrough secured to the bottom of the cylinder, and a head with an outlet is secured in an air-tight fashion to the top of the cylinder;

a piston residing in the cylinder, the piston comprising a cylindrical body having a boss at one end and a circumferential wall, an axial rod connecting the boss to the steering mechanism of the vehicle, at least one o-ring groove formed in the circumferential wall where at least one o-ring resides, wherein the cylinder and the piston are axially aligned, and the cylinder and the cap are movable axially as a single unit relative to the piston between an extended position and a collapsed position;

biasing means for biasing the piston and the cap apart;

a seal hermetically secured within the head, wherein the seal and the interior wall and the piston define an air cavity;

pressurized gas being contained in the air cavity; and, an inflatable air bag positioned within the steering wheel for protecting an occupant.

15. The combination of claim 14 wherein the air cavity, the seal and the head are generally axially aligned.

16. The steering column safety device of claim 14 wherein the seal comprises a frangible body having a pair of opposite sides and a wall connecting the sides, a seal bore with an explosive charge residing therein formed in the wall.

17. The combination of claim 16 further comprising a head bore formed in the head for connecting the seal and the exterior of the head, and wires electrically connecting the explosive charge to the sensing means.

18. The combination of claim 17 wherein the rod has a cross-section, and the configuration of the bore in the cap is shaped for receiving the rod such that the cylinder, the rod, and the piston rotate as a single unit about an axis to transmit steering torque to the steering mechanism.

19. A. The motor vehicle steering column safety device of claim 18 further comprising damping means for damping force placed on the cylinder by an occupant upon collision.

20. The motor vehicle steering column safety device of claim 18 wherein the biasing means comprises a coil spring positioned in the cylinder.

21. The steering column safety device of claim 19 wherein the damping means is a coil spring.

22. A steering column safety device and valve head combination for use in a motor vehicle having a steering wheel for communicating steering torque to a steering mechanism, and having collision sensing means for sensing a collision operably mounted on the vehicle, the device comprising:

a hollow cylinder having a top end and a bottom end, the top end adapted to be connected to a steering wheel;

a piston residing within the cylinder, the hollow cylinder being axially slideable on the piston between an extended position and a collapsed position, an elongated rod with one end secured to the piston and its other end adapted to be connected to the steering mechanism such that rotation of the steering wheel is communicated to the steering mechanism via the hollow cylinder and the piston to control the direction of travel of the vehicle;

sealing means for sealing the hollow cylinder in order to define an air-tight cavity within the hollow cylinder, the air-tight cavity containing prior to collision pressurized gas;

opening means to rapidly open the sealing means in response to a signal generated by the collision sensing means, thereby permitting movement of the hollow cylinder from the extended position to the collapsed position.

23. The steering column safety device and valve head combination of claim 22 wherein an air bag is positioned with the steering wheel for protecting an occupant.

* * * * *